(12) United States Patent
Watanabe et al.

(10) Patent No.: US 11,384,902 B2
(45) Date of Patent: Jul. 12, 2022

(54) PRESSURE VESSEL AND METHOD FOR WINDING FILAMENT

(71) Applicant: YACHIYO INDUSTRY CO., LTD., Sayama (JP)

(72) Inventors: Yoshihiro Watanabe, Sayama (JP); Kazuhiro Nakamura, Sayama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 507 days.

(21) Appl. No.: 15/306,167

(22) PCT Filed: Feb. 26, 2015

(86) PCT No.: PCT/JP2015/055606
§ 371 (c)(1),
(2) Date: Oct. 24, 2016

(87) PCT Pub. No.: WO2015/162994
PCT Pub. Date: Oct. 29, 2015

(65) Prior Publication Data
US 2017/0045181 A1 Feb. 16, 2017

(30) Foreign Application Priority Data

Apr. 25, 2014 (JP) .............................. JP2014-090975

(51) Int. Cl.
*F17C 1/06* (2006.01)
*F16J 12/00* (2006.01)
(Continued)

(52) U.S. Cl.
CPC ................ *F17C 1/06* (2013.01); *B29C 70/16* (2013.01); *B29C 70/32* (2013.01); *F16J 12/00* (2013.01);
(Continued)

(58) Field of Classification Search
CPC ........ F17C 2203/0345; F17C 2203/035; F17C 2203/0656; F17C 2203/0663;
(Continued)

(56) References Cited

U.S. PATENT DOCUMENTS 2,161,442 A * 6/1939 Wallace ............... B29D 23/001
425/385
3,331,722 A * 7/1967 Ponemon ............ B29C 53/605
156/425
(Continued)

FOREIGN PATENT DOCUMENTS

CN 2591340 Y 12/2003
CN 102414011 A 4/2012
(Continued)

OTHER PUBLICATIONS

Office Action dated Sep. 5, 2017 in the counterpart Chinese patent application 201580019874.4 with the English translation thereof.
(Continued)

*Primary Examiner* — Allan D Stevens
(74) *Attorney, Agent, or Firm* — Jeffrey T. Gedeon; Anne G. Sabourin

(57) ABSTRACT

Provided are a pressure vessel and a method for winding a filament that allow a reinforcing layer to have an even thickness. The pressure vessel includes: a liner (2) having a hollow portion; and a reinforcing layer (4) that covers the circumference of the liner (2). The reinforcing layer (4) is formed by binding bands (11) composed of reinforced fibers around the liner (2) so as to be layered, a lap portion (21, 22) is formed with ends of the adjacent bands (11, 11) superposed one on another in each layer of the reinforcing layer (4); and at least one end of the adjacent bands (11, 11) in the lap portion (21, 22) is formed thinner than any other portion of the band (11).

9 Claims, 10 Drawing Sheets

(51) Int. Cl.
*B29C 70/32* (2006.01)
*B29C 70/16* (2006.01)
*B29L 31/00* (2006.01)

(52) U.S. Cl.
CPC ............. *B29L 2031/7156* (2013.01); *F17C 2201/0109* (2013.01); *F17C 2203/0604* (2013.01); *F17C 2203/0663* (2013.01); *F17C 2209/2154* (2013.01); *F17C 2260/011* (2013.01)

(58) Field of Classification Search
CPC ...... F17C 2203/0665; F17C 2203/0668; F17C 2203/067; F17C 2203/0675; F17C 2203/0609; F17C 2203/0619; F17C 2203/0621; F17C 2203/0624; F17C 2203/0626; F17C 2203/0629; F17C 2203/0631; F17C 1/06; F17C 1/02; F17C 1/04; F17C 2209/2154; F17C 2209/2163; F17C 2209/232; F17C 2260/011; B65D 90/029; B29C 53/587
USPC ............. 220/590, 589, 586, 588, 591
See application file for complete search history.

(56) References Cited

U.S. PATENT DOCUMENTS

| | | | | |
|---|---|---|---|---|
| 4,369,894 A | * | 1/1983 | Grover | B29C 53/605 220/560.09 |
| 5,273,603 A | * | 12/1993 | Park | B29C 53/602 156/175 |
| 5,653,358 A | * | 8/1997 | Sneddon | F17C 1/16 220/590 |
| 6,114,000 A | | 9/2000 | Muroi et al. | |
| 6,119,887 A | * | 9/2000 | Palazzo | B65D 90/505 220/586 |
| 6,719,165 B2 | * | 4/2004 | Wright | B29C 63/0021 |
| 7,316,327 B2 | * | 1/2008 | Wright | B29C 63/0021 220/4.13 |
| 8,464,893 B2 | | 6/2013 | Iida et al. | |
| 2003/0019874 A1 | * | 1/2003 | Wright | B29C 63/0021 220/589 |
| 2011/0091684 A1 | * | 4/2011 | Holloway | B29C 70/386 428/113 |
| 2012/0037745 A1 | | 2/2012 | Aiyama | |
| 2014/0134378 A1 | * | 5/2014 | Downs | A43B 23/0225 428/57 |
| 2015/0192251 A1 | * | 7/2015 | Tupper | B65D 25/14 220/589 |
| 2015/0349596 A1 | * | 12/2015 | Schnoell | H02K 15/03 310/156.23 |
| 2017/0136716 A1 | * | 5/2017 | Shindo | B29C 70/32 |

FOREIGN PATENT DOCUMENTS

| | | | | |
|---|---|---|---|---|
| DE | 19500319 A1 | * | 7/1996 | ........... B29C 70/086 |
| JP | S54-106909 A | | 8/1979 | |
| JP | 2012-246962 A | | 12/2012 | |
| WO | 2006/132394 A1 | | 12/2006 | |

OTHER PUBLICATIONS

Extended European search report dated Jan. 19, 2018 issued in the counterpart EP patent application 15783471.4.

\* cited by examiner

FIG.10A

<SECOND EMBODIMENT>
STRENGTH OF FIRST TOW 31a, FIFTH TOW 31e = 0.7
STRENGTH OF SECOND TOW 31b TO FOURTH TOW 31d = 1.0

FIG.10B

<MODIFICATION>
STRENGTH OF FIFTH TOW 31e = 0.5
STRENGTH OF FIRST TOW 31a TO FOURTH TOW 31d = 1.0

PRESSURE VESSEL AND METHOD FOR WINDING FILAMENT

TECHNICAL FIELD

The present invention relates to a pressure vessel for storing gas or liquid and a method for winding a filament.

BACKGROUND ART

A pressure vessel is known which stores high pressure gas or liquid. For example, a pressure vessel disclosed in Patent Document 1 includes a resin liner having a hollow portion, a metal mouth member provided at an end of the liner, and a reinforcing layer (FRP layer) covering the liner and the metal mouth member. The reinforcing layer is formed by reinforced fibers such as carbon fibers or glass fibers being impregnated with curable resin so as to be wound around the liner by filament winding. A popular winding method as the filament winding is, for example, high angle helical winding, low angle helical winding or hoop winding.

FIG. 11 is an enlarged cross-sectional view showing a conventional pressure vessel. FIG. 11 schematically shows a first layer Z1 and a second layer Z2 to be formed on a liner 102 when a reinforcing layer is formed. As shown in FIG. 11, when the first layer Z1 is formed, for example, bands 111 having a plurality of band-shaped tows are impregnated with curable resin, and are wound around the liner 102 such that adjacent bands 111, 111 are superposed by one tow (one bundle) to form lap portions 121, 122. When the first layer Z1 is formed, for example, the bands 111 are wound by low angle helical winding. It is conceivable that the adjacent bands 111, 111 are wound along each other without being superposed at ends thereof, but the ends of the adjacent bands 111, 111 are superposed to prevent a gap between the adjacent bands 111, 111 due to variations at the time of winding.

Further, when the second layer Z2 is formed, for example, bands 112 are impregnated with curable resin, and are wound around the liner 102 (first layer Z1) such that adjacent bands 112, 112 are superposed by one tow to form the lap portions. The second layer Z2 is wound, for example, by hoop winding. In short, the second layer Z2 is formed such that the bands 112, 112 are wound so as to cross the bands 111, 111 of the first layer Z1.

PRIOR ART DOCUMENT

Patent Document

Patent Document 1: Japanese Patent Application Publication No. 2012-246962

SUMMARY OF THE INVENTION

Problems to be Solved by the Invention

As shown in FIG. 11, a thickness t2 of the lap portions 121, 122 of the first layer Z1 is twice a thickness t1 of a portion which is not lapped. Thus, each layer constituting the reinforcing layer is uneven, making it difficult to equalize the thickness of the reinforcing layer. In addition, the thickness of the lap portions 121, 122 is approximately doubled, to have greater strength than that at portions not to be lapped, making it difficult to have even strength of the reinforcing layer.

The present invention aims to solve such problems and provides a pressure vessel that allows a reinforcing layer to have an even thickness or even strength. Further, the present invention provides a method for winding a filament that allows the reinforcing layer to have an even thickness or even strength.

Means to Solve Problems

To solve the problems above, the present invention provides a pressure vessel including: a liner having a hollow portion; and a reinforcing layer that covers a circumference of the liner, wherein the reinforcing layer is formed by winding bands composed of reinforced fibers around the liner so as to be layered, a lap portion is formed with ends of the adjacent bands superposed one on another in each layer of the reinforcing layer; and at least one end of the adjacent bands in the lap portion is formed thinner than any other portion of the band.

The present invention provides a method for winding a filament in which bands composed of reinforced fibers are wound around a structure so as to be layered to form a reinforcing layer, including a step of: winding the bands around the structure while ends of the adjacent bands are superposed to form a lap portion, wherein at least one end of the adjacent bands in the lap portion is formed thinner than any other portion of the band.

According to the configuration, at least one end of the band constituting the lap portion is formed thin, to have the thin lap portion, allowing the reinforcing layer to have an even thickness. Further, the thickness of the end of the band is made thin, allowing the pressure vessel to be reduced in weight and to have less material costs.

The strength per unit area of at least one end of the adjacent bands in the lap portion is preferably formed higher than that of any other portion of the band.

The configuration allows the reinforcing layer to have an even thickness and even strength.

In addition, the present invention provides a pressure vessel including: a liner having a hollow portion; and a reinforcing layer that covers a circumference of the liner, wherein the reinforcing layer is formed by winding bands composed of reinforced fibers around the liner so as to be layered, a lap portion is formed with ends of the adjacent bands superposed one on another in each layer of the reinforcing layer; and strength per unit area of at least one end of the adjacent bands in the lap portion is formed lower than that of any other portion of the band.

Further, the present invention provides a method for winding a filament in which bands composed of reinforced fibers are wound around a structure so as to be layered to form a reinforcing layer, including a step of: winding the bands around the structure while ends of the adjacent bands are superposed one on another to form a lap portion, wherein strength per unit area of at least one end of the adjacent bands in the lap portion is formed lower than that of any other portion of the band.

According to the configuration, the strength of at least one end of the band constituting the lap portion is lowered, allowing for reducing the material costs and having even strength of the reinforcing layer.

Further, at least one end of the adjacent bands in the lap portion is preferably formed thinner than any other portion of the band.

The configuration allows for further reducing the material costs and allows the reinforcing layer to have an even thickness.

Effect of the Invention

A pressure vessel and a method for winding a filament according to the present invention allow the reinforcing layer to have an even thickness or even strength.

BRIEF DESCRIPTION OF THE DRAWINGS

FIG. 10A is a conceptual diagram showing strength of the first layer in the second embodiment, FIG. 10B is a conceptual diagram showing strength of the first layer in a modification of the second embodiment.

EMBODIMENTS OF THE INVENTION

First Embodiment

Figure 1:
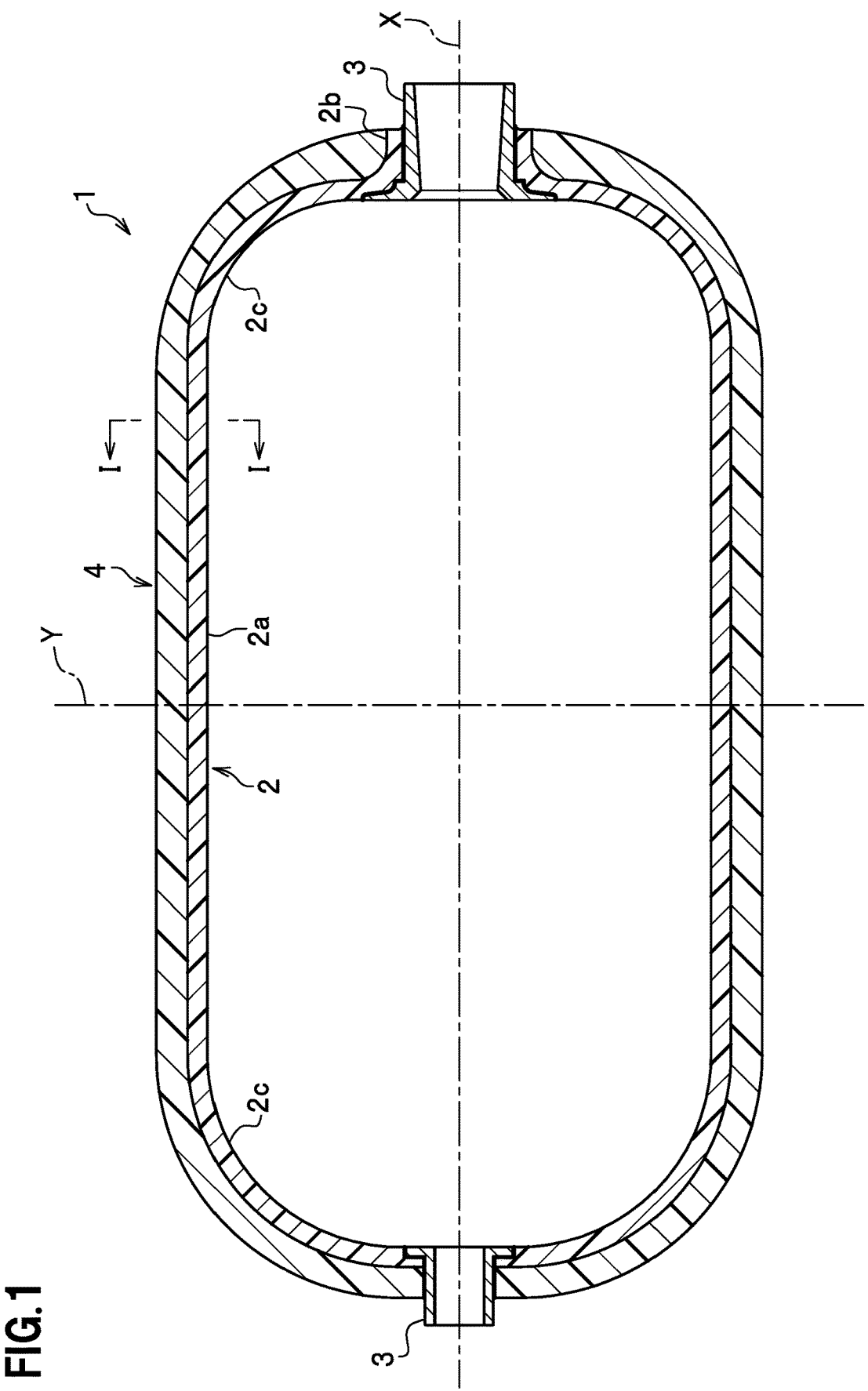
FIG. 1 is a vertical cross-sectional view of a pressure vessel according to a first embodiment of the present invention.

A description will be given in detail of an embodiment of the present invention with reference to drawings. As shown in FIG. 1, a pressure vessel 1 according to the present embodiment is mainly formed with a liner 2, metal mouth members 3, 3, and a reinforcing layer 4. The pressure vessel 1 is a hollow vessel capable of containing, for example, liquid or gas therein. Note that, in the following description, a center axis of the metal mouth member 3 is referred to as an "X-axis", and an axis perpendicular to the X-axis is referred to as a "Y-axis".

As shown in FIG. 1, the liner 2 is made of resin and is hollow inside. A material of the liner 2 is not particularly restricted, and may be formed of, for example, polyethylene (PE), high density polyethylene (HDPE), polyamide, polyketone, or polyphenylene sulfide (PPS), depending on a type of the contained gas or liquid, or application. The liner 2 made from resin can be reduced in weight.

In the present embodiment, the liner 2 includes a body 2a in a cylindrical shape, shoulders 2c, 2c formed at both sides of the body 2a, and a neck 2b in a cylindrical shape which protrudes outwardly in a charge/discharge direction along the X-axis at one shoulder 2c. The shoulder 2c is formed in a curved shape. In the present embodiment, the body 2a, the neck 2b and the shoulder 2c are integrally molded, but may be formed by welding a plurality of pieces. The metal mouth member 3 is a metallic cylindrical member which is arranged inside the neck 2b in a radial direction. In the present embodiment, the metal mouth member 3 is arranged inside the neck 2b in the radial direction, but may be arranged outside the neck 2b in the radial direction.

The reinforcing layer (FRP layer) 4 is formed to cover the liner 2 and a periphery of the metal mouth members 3, and as shown in FIG. 1 the reinforcing layer covers an entire outer surface of the liner except for a small, outward-facing, annular portion of the liner neck 2b at one end of the liner. The reinforcing layer 4 includes layered reinforced fibers such as carbon fibers and glass fibers, and is integrally formed by curable resin which is impregnated in the reinforced fibers at the time of molding curing.

Figure 2A:
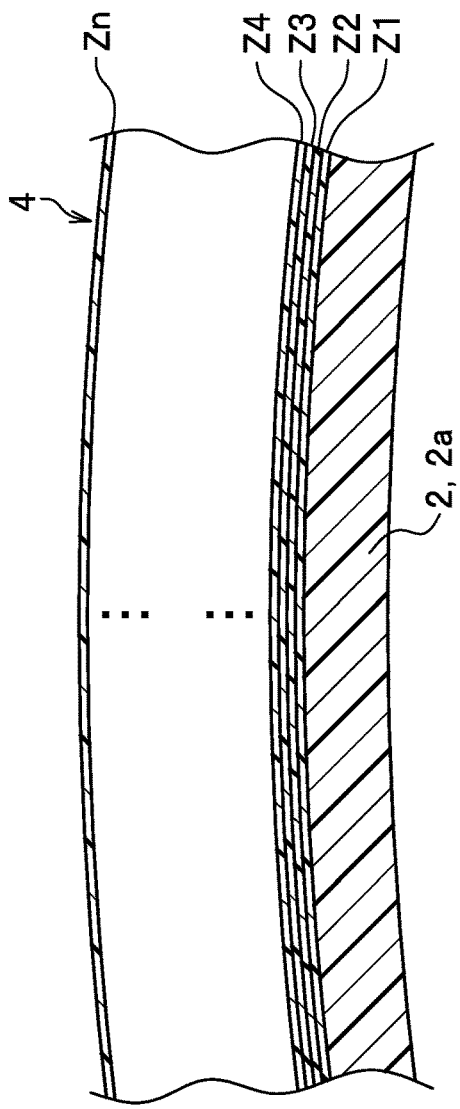
FIG. 2A is a cross-sectional view along an I-I line in FIG. 1.

As shown in FIG. 2A, the reinforcing layer 4 has reinforced fibers layered around the liner 2 such as with a first layer Z1, a second layer Z2, a third layer Z3, a fourth layer Z4, . . . a n-th layer. Note that, in FIGS. 2A and 2B, each layer Zn of the reinforcing layer 4 is actually very thin, but the thickness thereof is shown thicker than the actual size, for the purpose of illustration.

The number of layers of the reinforced fibers may be appropriately selected based on application of the pressure vessel 1. The winding method for the reinforced fibers is not particularly restricted, and the reinforced fibers are preferably wound in a well-balanced manner by appropriately selecting a plurality of winding methods such as low angle helical winding, hoop winding, and high angle helical winding.

Figure 2B:
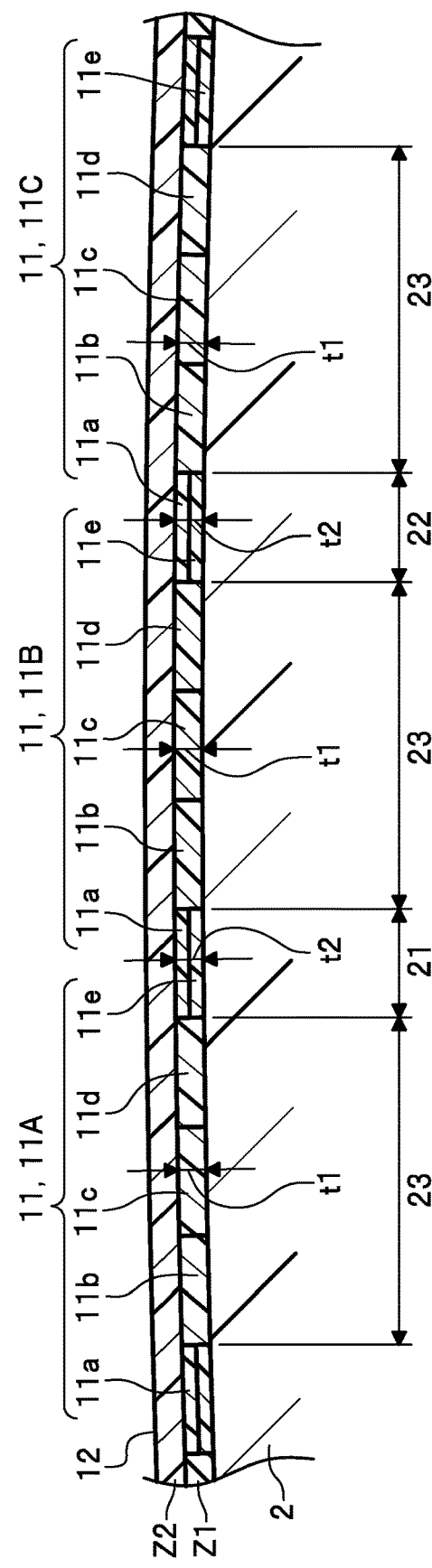
FIG. 2B is an enlarged cross-sectional view of a first layer and a second layer of a reinforcing layer in FIG. 2A.

FIG. 2B is an enlarged cross-sectional view of the first layer and second layer of the reinforcing layer 4. As shown in FIG. 2B, the first layer Z1 in contact with an outer peripheral surface of the liner 2 is formed such that the band is wound by low angle helical winding with ends of the bands 11 (11A), 11 (11B), 11 (11C) superposed on each other. The first layer Z1 is formed over the entire body 2a and shoulders 2c, 2c of the liner 2. Note that, in the following description, each wound band is marked with "11A", "11B" and "11C" so as to be distinguished from one another.

Figure 3:
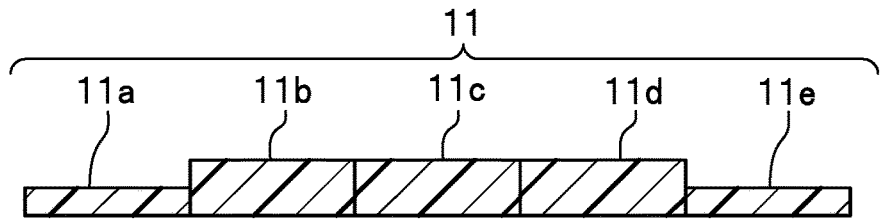
FIG. 3 is a cross-sectional view of a band according to the first embodiment.

As shown in FIG. 3, the band 11 has a first tow 11a, a second tow 11b, a third tow 11c, a fourth tow 11d and a fifth tow 11e aligned in a lateral direction.

Each tow in the band 11 is a bundle of reinforced fibers such as glass fibers and carbon fibers. In the present embodiment, reinforcing fibers of the same type are used for each bundle. The second tow 11b, third tow 11c and fourth tow 11d are formed to have the same width and thickness. In contrast, the first tow 11a and fifth tow 11e constituting the ends of the band 11 have the same width as the second tow 11b, but have a thickness about half the second tow 11b. In the present embodiment, the number of carbon fibers of the first tow 11a and fifth tow 11e is made approximately half that of the second tow 11b, to set the thickness of the former half of the latter.

As shown in FIG. 2B, in the first layer Z1, the ends of the adjacent bands 11A, 11B are superposed to form a lap portion 21. In a similar manner, the ends of the adjacent bands 11B, 11C are superposed to form a lap portion 22. A portion where the adjacent bands 11 are not superposed on each other, that is, a portion from the second tow 11b to fourth tow 11d is a non-lap portion 23.

The lap portion 21 is formed by superposing the first tow 11a of the band 11B on the fifth tow 11e of the band 11A. A lap length may be appropriately set, and in the present embodiment, the lap length is set to be the width of a tow (one bundle). As described above, each thickness of the fifth tow 11e of the band 11A and the first tow 11a of the band 11B is approximately half the thickness t1 of the second tow 11b. Therefore, the thickness t2 of the lap portion 21 is approximately the same as the thickness t1 of the non-lap portion 23.

The lap portion 22 is formed by superposing the first tow 11a of the band 11C on the fifth tow 11e of the band 11B. As described above, each thickness of the fifth tow 11e of the band 11B and the first tow 11 of the band 11C is approximately half the thickness t1 of the second tow 11b. Therefore, the thickness t2 of the lap portion 22 is approximately the same as the thickness t1 of the non-lap portion 23.

As shown in FIG. 2B, the second layer Z2 is formed by hoop winding on the outer peripheral surface of the first layer Z1. Referring to FIG. 1, bands 12 are wound in a circumferential direction (Y-axis direction in a planar view) of the body 2a of the liner 2 by hoop winding. Accordingly, the bands 12 are wound so as to cross the bands 11A, 11B, 11C. In the second layer Z2, as in the first layer Z1, lap portions are formed with the ends of the bands 12 superposed by the width of a tow, and non-lap portions are formed where adjacent bands 12 are not superposed.

Though a specific illustration is not shown, as in the first layer Z1 and second layer Z2, lap portions are formed with the ends of the bands superposed by the width of a tow, and non-lap portions are formed where the adjacent bands 12 are not superposed in the third layer Z3 and the following layers.

Figure 4:
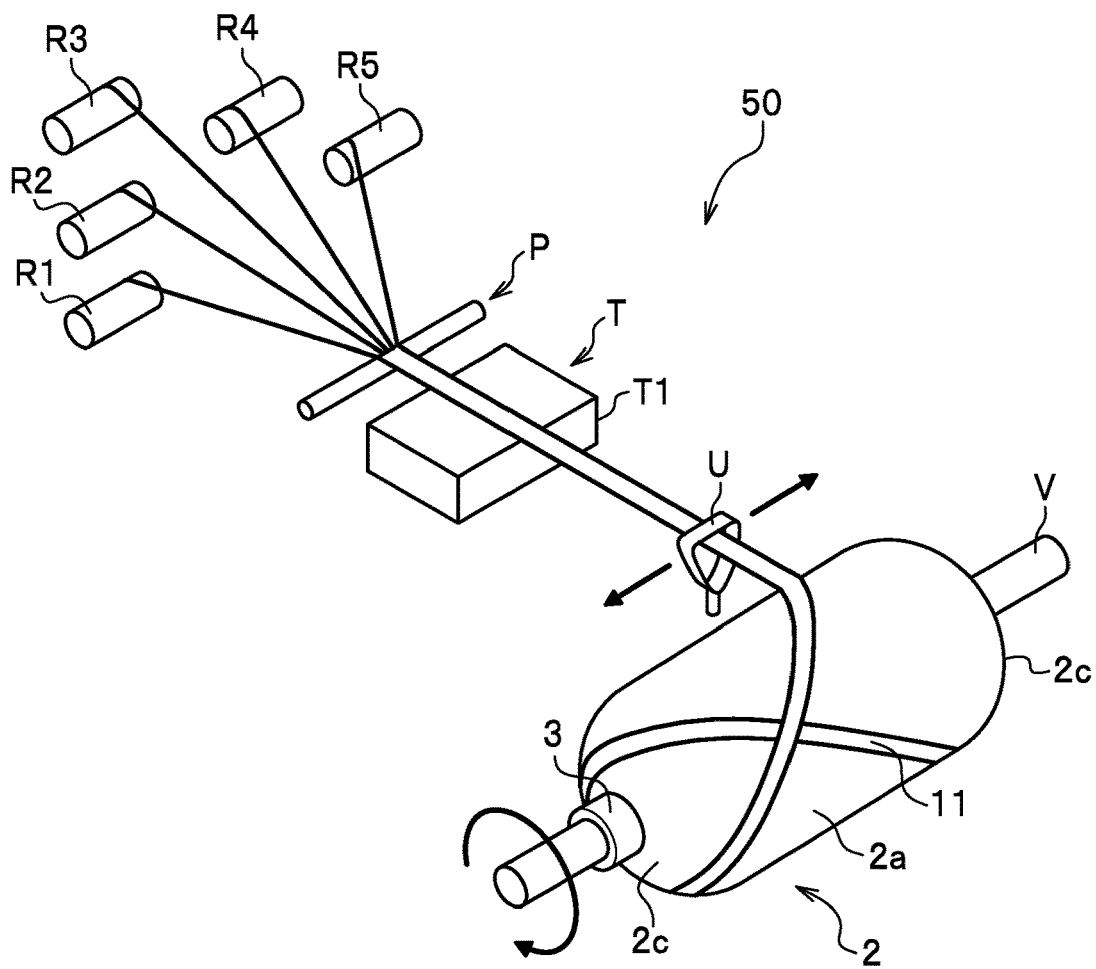
FIG. 4 is an entire perspective view of a reinforcing layer forming device according to the first embodiment.

Next, a description will be given of a reinforcing layer forming step for forming the reinforcing layer 4. As shown in FIG. 4, filament winding is executed by a reinforcing layer forming device 50 in the reinforcing layer forming step according to the present embodiment. First of all, the reinforcing layer forming device 50 will be described which makes five tows into one band. The reinforcing layer forming device 50 mainly includes a first roll R1 to a fifth roll R5, a collecting unit P, a resin-impregnating unit T, a jig U, and a rotating shaft V. Note that the ends of the liner 2 are fixed by the metal mouth members 3, 3.

The first roll R1 to fifth roll R5 are bobbins on which the reinforced fibers are wound. The first roll R1 is a bobbin for feeding the first tow 11a, and the second roll R2 is a bobbin for feeding the second tow 11b. Similarly, the third roll R3 to fifth roll R5 are bobbins for feeding the third tow 11c to fifth tow 11e, respectively. In the present embodiment, the number of the reinforced fibers in respective bundles fed from the first roll R1 and fifth roll R5 is approximately half the number of the reinforced fibers in respective bundles fed from the second roll R2 to fourth roll R4.

The collecting unit P collects the first tow 11a to fifth tow 11e so as to be aligned in the lateral direction to form the bands 11, 12. The resin-impregnating unit T is provided with a pallet T1 that stores the curable resin. The resin-impregnating unit T is configured to impregnate the bands 11, 12 with the curable resin when the bands 11, 12 pass thereon. As shown the lateral width of each of the bands is uniform along its longitudinal length.

The jig U is arranged between the resin-impregnating unit T and the liner 2 and supports the bands 11, 12 impregnated with the curable resin so as to be insertable. Further, the jig U is configured to be reciprocatable in a longitudinal direction of the rotary shaft V. The rotary shaft V is a member which immovably holds the liner 2 and rotates about its axis.

The reinforcing layer forming device 50 rotates the liner 2 by the rotation of the rotary shaft V and reciprocates the jig U along the longitudinal direction of the rotary shaft V to wind the bands 11, 12 around the liner 2. The reinforcing layer forming device 50 is provided with a controller (not shown), and a winding method for the filament winding, a lap length, a winding speed and the like can be set by operating the controller.

The reinforcing layer forming step includes a first layer forming step, a second layer forming step, and an n-th layer forming step. A band is formed with n-layers in the present embodiment, and the first layer forming step and second layer forming step will be described hereinbelow.

Figure 5A:
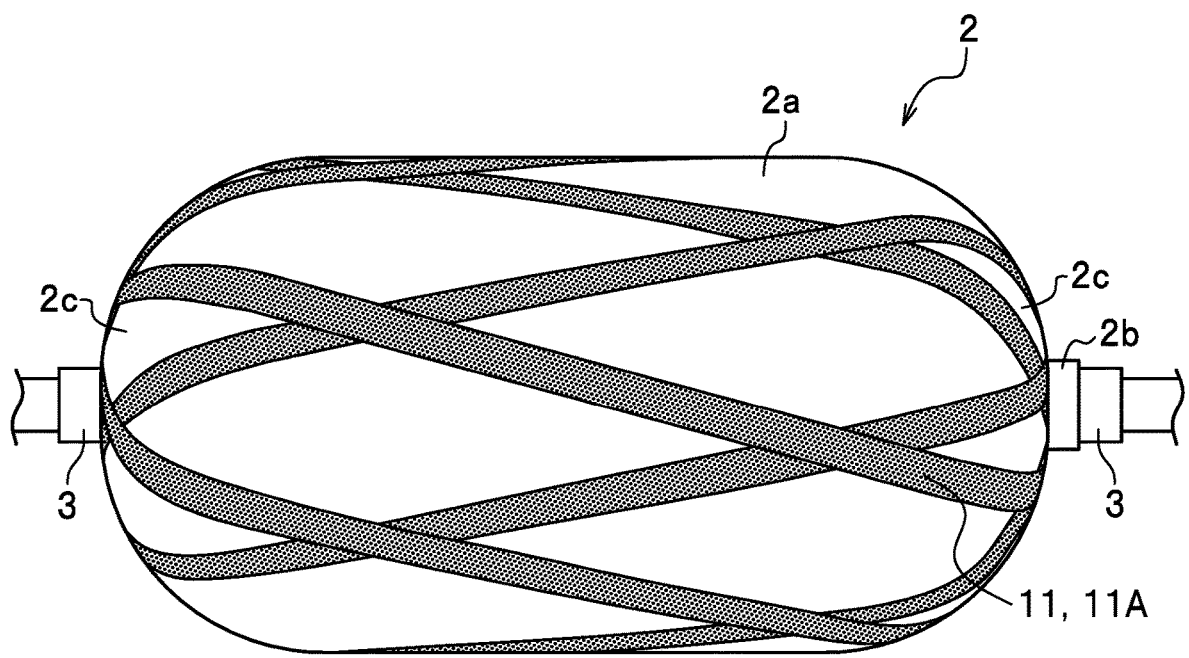
FIG. 5A is a side view of a state at an end of eighth lap when a first layer forming step is executed at a rate of eight laps (rounds) per revolution.
Figure 5B:
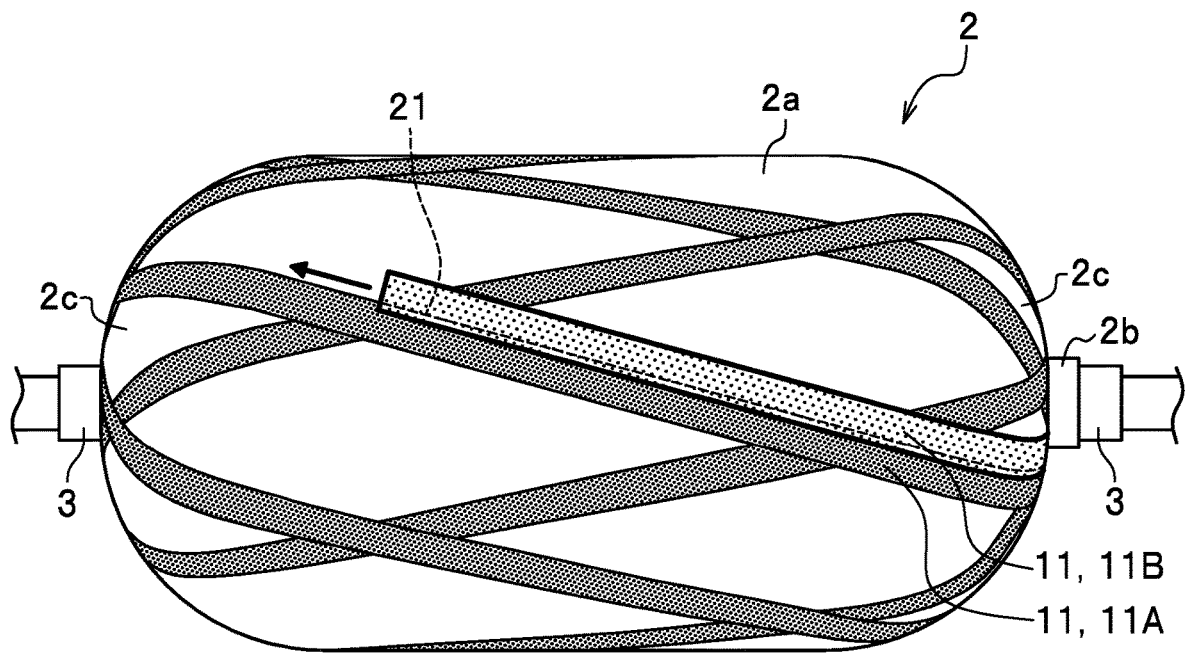
FIG. 5B is a side view of a state of a ninth lap in the first layer forming step.

FIG. 5A is a side view of a state at the end of an eighth lap when the first layer forming step is executed at a rate of eight laps per revolution, and FIG. 5B is a side view of a state of a ninth lap in the first layer forming step. As shown in FIG. 5A, in the first layer forming step for forming the first layer Z1 of the reinforcing layer 4, the band 11 is wound around the liner 2, for example, by low angle helical winding. More specifically, the band 11 is wound around the liner with predetermined tension in order of the body 2a, one shoulder 2c, the body 2a, the other shoulder 2c, and the body 2a. An orientation angle (angle to the axis X) may be set appropriately, and, for example, in the present embodiment, is set to be approximately 15 degrees.

In the present embodiment, a first cycle is completed after the eighth lap. From a second cycle, adjacent bands 11, 11 are wound so as to be superposed for forming the lap portion 21.

In other words, as shown in FIG. 5B, in a first lap of a second cycle (ninth lap in total), the end of the band 11B is wound to superpose, by one tow (one bundle), the end of the band 11A. Accordingly, the lap portion 21 is formed. Similarly, the bands 11 are wound so as to superpose the ends to cover the outer peripheral surface of the liner 2 without any gap, so that the first layer Z1 is formed.

After the first layer forming step is completed, the second layer forming step is executed. In the second layer forming step for forming the second layer Z2 of the reinforcing layer 4, the band 12 is wound around the liner 2 (periphery of the first layer Z1), for example, by hoop winding. The orientation angle (angle to the axis X) may be set appropriately, and, for example, in the present embodiment, is set to be approximately 88 degrees. Though a specific illustration is not shown, in the second layer forming step, the bands 12 are wound so as to superpose the ends by one tow in the same manner as the first layer forming step. The periphery of the body 2a is covered with the bands 12 without any gap, to form the second layer Z2.

Then, winding methods are changed to wind the bands sequentially in the third layer forming step, the fourth layer forming step and the n-th layer forming step. Once the predetermined number of layers are wound, a drying step is executed to dry the impregnated resin in respective bands. This forms the reinforcing layer 4.

According to the pressure vessel 1 in the present embodiment described above, as shown in FIG. 2B, the ends of the bands 11A, 11B and bands 11B, 11C which constitute the lap portions 21, 22, respectively, are made thin, which makes the thickness of the lap portions 21, 22 thin, allowing the reinforcing layer 4 to have an even thickness.

Especially, in the present invention, the lap length is set to the width of a tow while the thickness of the first tow 11a and fifth tow 11e of the band 11 is set to half the thickness of other tows (e.g., the second tow 11b). In other words, the width and the lap length of the thin portions at the ends of the bands 11 is set to the same while the thickness of the first tow 11a and fifth tow 11e is set to half the thickness of other tows. This makes the thickness t2 of the lap portions 21, 22 the same as the thickness t1 of the non-lap portion 23, allowing the thickness to be even. Accordingly, at the time of forming the second layer Z2 and the like, the bands are wound without any uneven portion. In addition, the second layer Z2 and the like are formed in the same manner as the first layer Z1, allowing the entire reinforcing layer 4 to have an even thickness.

Further, according to the present embodiment, reduction in thickness at the ends of the bands 11, 12 allows the pressure vessel 1 to have a reduced weight and reduced material costs.

Figure 6A:
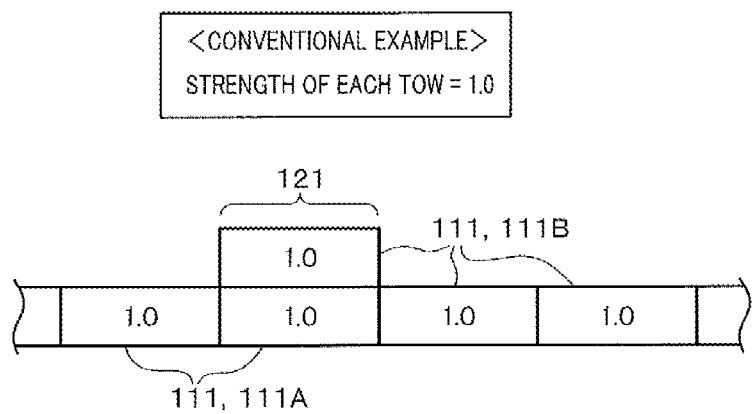
FIG. 6A is a conceptual diagram showing strength of the first layer in a conventional example.
Figure 6B:
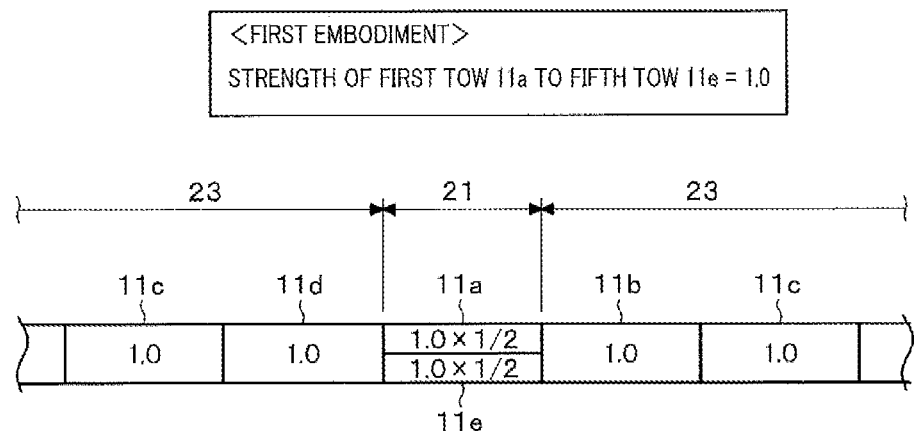
FIG. 6B is a conceptual diagram showing strength of the first layer in the first embodiment.

FIG. 6A is a conceptual diagram showing the strength of the conventional example, and FIG. 6B is a conceptual diagram showing the strength of the first embodiment. As shown in FIG. 6A, in the conventional example, the thickness and strength of each tow of the bands 111 (111A) and 111 (111B) are made all the same. Here, each tow is assumed to have, for example, unit strength of "1.0". In the conventional example, the thickness and strength of each tow are made all the same, so that the lap portion 121 has the actual strength of approximately "2.0".

On the other hand, as shown in FIG. 6B, in the first embodiment, the first tow 11a to fifth tow 11e each have the same unit strength of "1.0", but the first tow 11a and fifth tow 11e constituting the lap portion 21 each have the thickness of other portions. Therefore, the first tow 11a and fifth tow 11e each have the actual strength of approximately "0.5". Accordingly, the lap portion 21 has the actual strength of approximately "1.0" as a sum of the strength of the first tow 11a and fifth tow 11e. This allows the lap portion 21 and the non-lap portion 23 to have even strength per unit area.

In order to have even strength, properties (e.g., tensile strength, elastic modulus) of the first tow 11a and fifth tow 11e may be preferably selected such that reactive force per unit area acting on the lap portions 21, 22 approximately equals to that acting on the non-lap portion 23 when internal pressure acts in the pressure vessel 1.

FIGS. 6A and 6B describe the strength of the lap portion 21 and the non-lap portion 23, but the same applies to rigidity. That is, the first embodiment allows the lap portion 21 and the non-lap portion 23 to have even rigidity per unit area.

In order to have even rigidity, properties (e.g., tensile strength, elastic modulus) of the first tow 11a and fifth tow 11e may be preferably selected such that bending stress acting on the lap portions 21, 22 approximately equals to that acting on the non-lap portion 23 when internal pressure acts in the pressure vessel 1.

Figure 11:
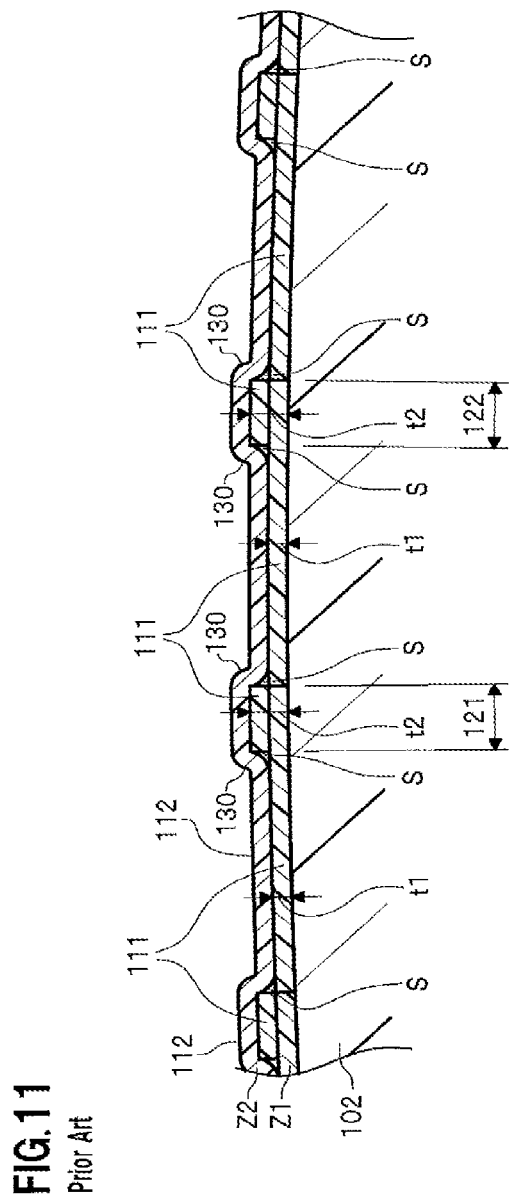
FIG. 11 is an enlarged cross-sectional view of a conventional pressure vessel.

Also, referring to FIG. 11, in the conventional reinforcing layer, when the second layer Z2 is formed on the first layer Z1, voids S are formed at the sides of the lap portion 121 of the first layer Z1. Once the void S is formed, the impregnated curable resin easily pools therein, causing strength reduction. However, in the present embodiment, as shown in FIG. 2B, the thickness of the ends of the bands 11 is made half, and the width and lap length of the thin portions at the ends are set to be equal. Thus, there is no uneven portion in the first layer Z1, preventing the void S from being formed when the second layer Z2 is formed.

Also, referring to FIG. 11, in the conventional layer, the band 112 is bent at the lap portions 121, 122 so that bent portions 130 are formed. Stress tends to concentrate on the bent portions 130, causing strength reduction. However, in the present embodiment, as shown in FIG. 2B, the thickness of the ends of the bands 11 is made half, and the width of the thin portions of the ends and the lap length are set to be equal. Thus, there is no uneven portion in the first layer Z1, preventing the bent portions from being formed when the second layer Z2 is superposed. In other words, according to the present embodiment, the voids S and the bent portions 130 are not formed when the bands 11, 12 superpose one on the other, improving the strength.

Further, in the reinforcing layer forming step of the present embodiment, the number of bundles of the first roll R1 and fifth roll R5 is only made half that of the second roll R2 to fourth roll R4, allowing for making the reinforcing layer 4 easily.

The first embodiment of the present invention has been described above, but can be modified as appropriate with a scope not departing from the spirit of the present invention. For example, in the first embodiment, the width of the thin portions at the ends of the bands 11 and the lap length are set to be equal, but are not limited thereto. For example, the ends of the bands 11, 12 may be superposed by the width of 0.5 tows (half of one bundle), or by the width of 1.5 tows.

Referring to FIG. 2B, in a case where the ends are superposed by the width of 1.5 tows, for example, the fourth tow 11d and fifth tow 11e of the band 11A are superposed with the first tow 11a and second tow 11b of the band 11B, respectively. In this case, though the thickness of the lap portions is about 1.5 times larger compared with that of the non-lap portions, the thickness can be reduced as compared with the conventional lap portions (see FIG. 11). Further, lapping margins are increased due to superposing by the width of 1.5 tows, which prevents the voids from being formed between the adjacent bands 11, 11 (or 12, 12) in the reinforcing layer forming step.

Further, in the first embodiment, the thickness of the ends (first tow 11a and fifth tow 11e) of the bands 11, 12 is set to be half that of the other tows, but is not limited thereto. The thickness of the ends of the bands 11, 12 may be set thinner than that of portions other than the ends of the respective bands 11, 12.

Still further, in the first embodiment, one band is formed with five tows, but is not limited thereto. One band may be formed with six tows or more, or with four tows or less.

Figure 7A:
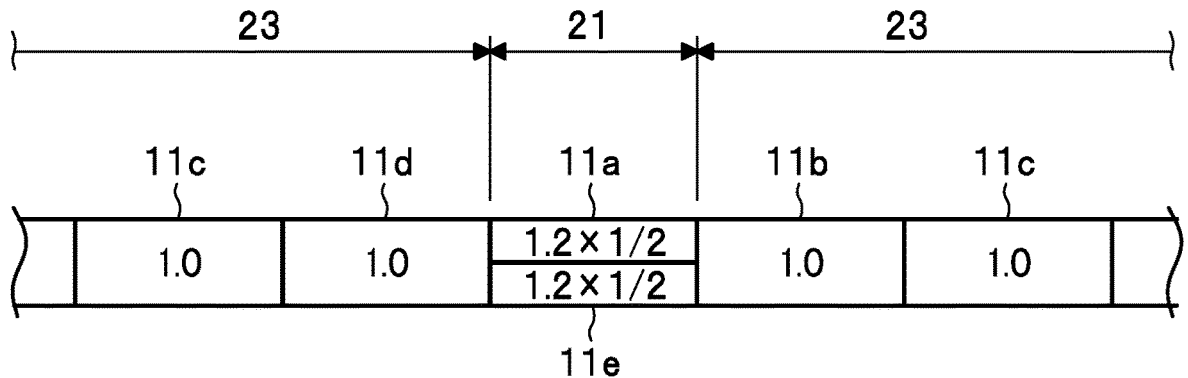
FIG. 7A is a conceptual diagram showing strength of the first layer in a first modification of the first embodiment.

Yet further, the tows at the ends of the bands 11, 12 may be made thin and properties (e.g., strength and elastic modulus) thereof may be changed. FIG. 7A is a conceptual diagram showing strength of a first modification of the first embodiment, and FIG. 7B is a conceptual diagram showing strength of a second modification of the first embodiment.

For example, as in the first modification shown in FIG. 7A, the thickness of the tows at the ends of the bands may be made thin and properties thereof may be improved. In the first modification, the second tow 11b to fourth tow 11d are each assumed to have the unit strength of "1.0", and the lap portion 21, including the first tow 11a and fifth tow 11e, is set to have, for example, the unit strength of "1.2". The thickness of the first tow 11a and fifth tow 11e is made half that of the other tows, so that the first tow 11a and fifth tow 11e each have the unit strength of approximately "0.6", respectively.

Therefore, the lap portion 21 has the actual strength of approximately "1.2". In the case where the strength of the ends of the bands is improved, the actual strength per unit area of the lap portion 21 is preferably set as appropriate within a range not exceeding "2.0". For example, in the case where the strength of the ends of the bands is improved, the strength per unit area of the lap portion 21 is preferably set as appropriate to be in a range less than twice the strength per unit area of the non-lap portion 23. Thus, making the ends of the bands thin and improving the strength of the ends of the bands also allow the lap portion 21 and the non-lap portion 23 to have even strength per unit area as compared with conventional cases.

Figure 7B:
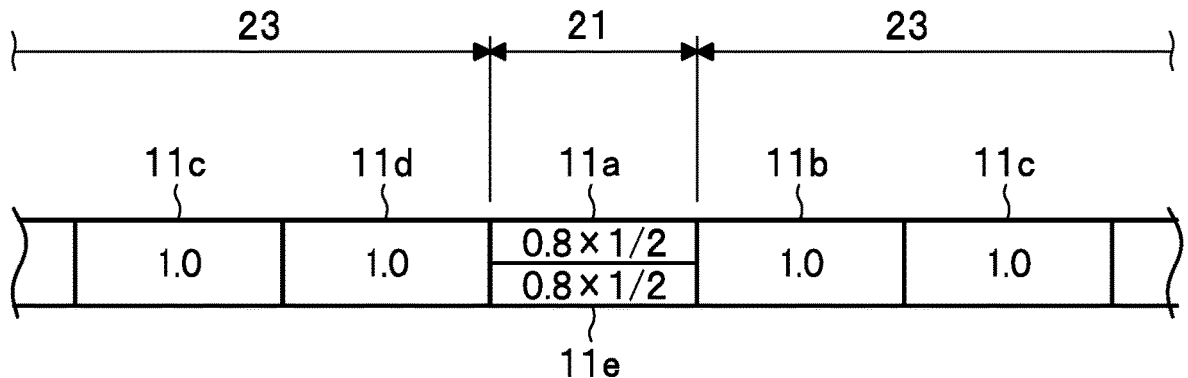
FIG. 7B is a conceptual diagram showing strength of the first layer in a second modification of the first embodiment.

Further, as in the second modification shown in FIG. 7B, the thickness of the tows at the ends of the bands may be made thin and the properties thereof may be degraded. In the second modification, the second tow 11b to fourth tow 11d are each assumed to have the unit strength of "1.0", and the lap portion 21, including the first tow 11a and fifth tow 11e, is set to have, for example, the unit strength of "0.8". The first tow 11a and fifth tow 11e are each made to have a thickness of half the thickness of the other tows, so that the first tow 11a and fifth tow 11e each have the unit strength of approximately "0.4".

Accordingly, the lap portion 21 is set to have the actual strength of approximately "0.8". In a case where the strength of the ends of the bands is reduced, the lap portion 21 may preferably be set to have an appropriate actual strength per unit area in a range closer to "1.0". In other words, in the case where the strength of the ends of the bands is reduced, the strength per unit area of the lap portion 21 may preferably be set so as to be closer to that of the non-lap portion 23. Thus, on the condition that the ends of the bands are made thin and the strength of the ends of the bands is reduced, the lap portion 21 and the non-lap portion 23 can have even strength per unit area as compared with the conventional cases. In addition, according to the second modification, the material costs can be reduced due to the strength of the ends of the bands being reduced.

Note that, in the first and second modifications, the strength of the lap portion 21 and non-lap portion 23 has been described, but the same holds true, for example, for rigidity. That is, according to the first and second modifications, the lap portion 21 and non-lap portion 23 have even rigidity per unit area.

Figure 8A:
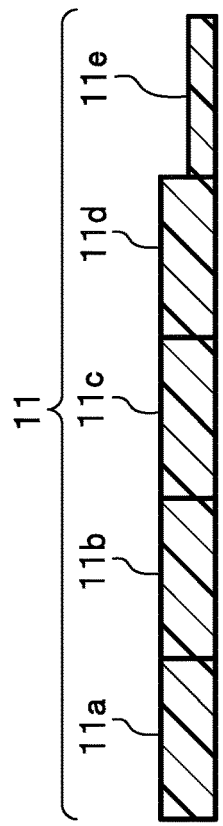
FIG. 8A is a cross-sectional view of a band according to a third modification of the first embodiment.
Figure 8B:
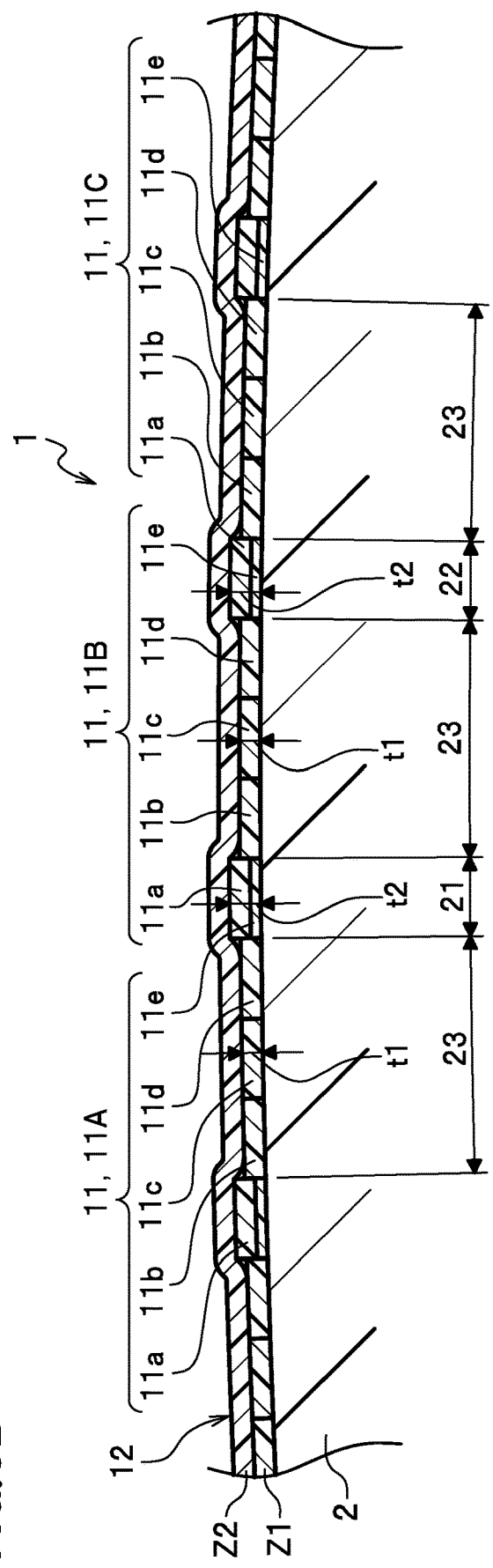
FIG. 8B is an enlarged cross-sectional view of a first layer and a second layer of a reinforcing layer according to the third modification of the first embodiment.

Further, in the first embodiment, both ends of the bands 11, 12 are made to have a thin thickness, but only either one of them may be made to have a thin thickness. FIG. 8A is a cross-sectional view of a band according to a third modification of the first embodiment, and FIG. 8B is an enlarged cross-sectional view of a first layer and a second layer in a reinforcing layer according to the third modification of the first embodiment.

As shown in FIG. 8A, in the third modification, for example, the first tow 11a to fourth tow 11d in the band 11 is formed to have the same thickness, and the fifth tow 11e is made to have a thinner thickness than the other tows. In the third modification, the thickness of the fifth tow 11e is approximately half the thickness of the other tows. As shown in FIG. 8B, in the reinforcing portion forming step, the fifth tow 11e having a thin thickness is superposed with the first tow 11a having a normal thickness by one tow (one bundle) between the adjacent bands 11. In this case, though the thickness t2 of the lap portions 21, 22 is approximately 1.5 times larger as compared with the thickness t1 of the non-lap portion 23, the thickness t2 is thinner than that of the conventional lap portions 121, 122 (see FIG. 11).

Second Embodiment

Next, a description will be given of a pressure vessel according to a second embodiment. The pressure vessel according to the second embodiment is different from that in the first embodiment in terms of the structure at the ends of a band. Portions different from the first embodiment will be mainly described.

Figure 9A:
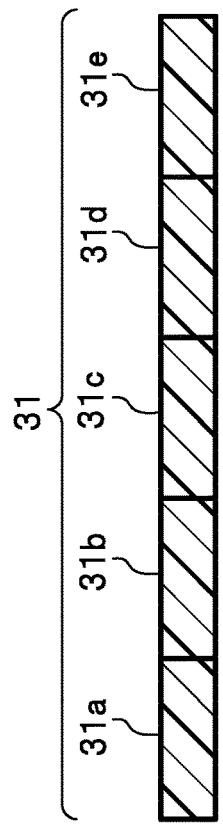
FIG. 9A is a cross-sectional view of a band according to a second embodiment.
Figure 9B:
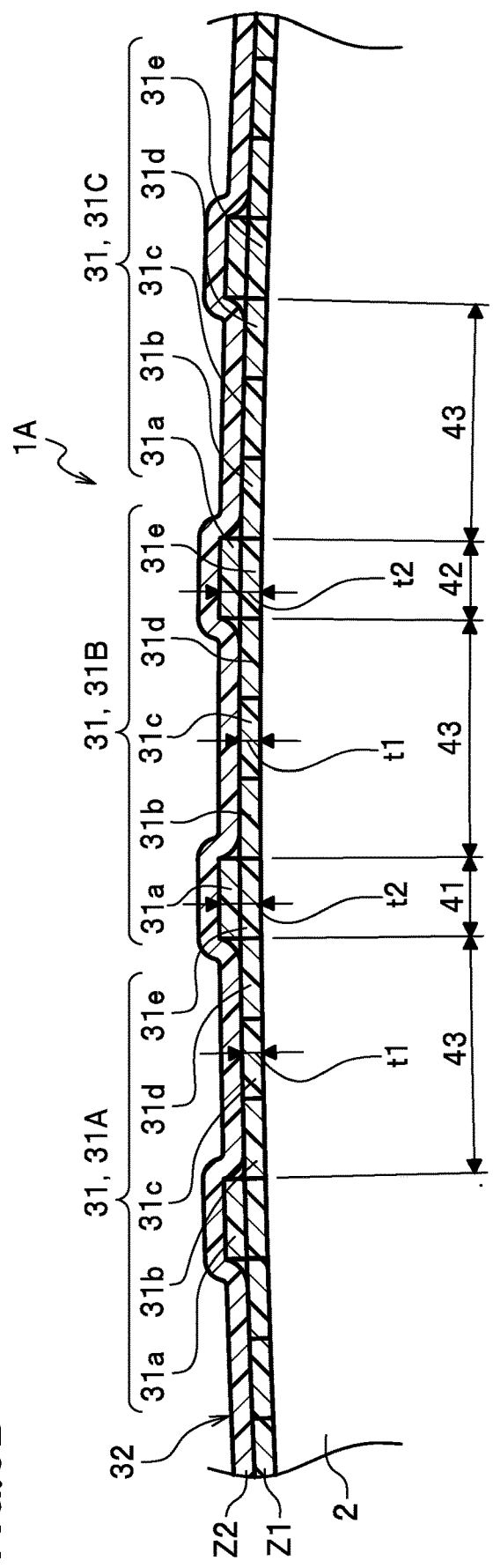
FIG. 9B is an enlarged cross-sectional view of a first layer and a second layer of a reinforcing layer according to the second embodiment.

FIG. 9A is a cross-sectional view of a band according to the second embodiment, and FIG. 9B is an enlarged cross-sectional view of the first layer and second layer of the reinforcing layer according to the second embodiment. As shown in FIG. 9A, the band 31 includes a first tow 31a, a second tow 31b, a third tow 31c, a fourth tow 31d and a fifth tow 31e which are aligned in the lateral direction.

Each tow of the band 31 is a bundle of reinforced fibers. The first tow 31a to fifth tow 31e are each formed to have the same width and thickness. Meanwhile, the first tow 31a and fifth tow 31e are formed from carbon fibers which has a lower property (for example, strength, elastic modulus) than that of the second tow 31b to fourth tow 31d. Specifically, in the present embodiment, the first tow 31a and fifth tow 31e are formed from carbon fibers having lower strength (tensile strength) than that of the second tow 31b to fourth tow 31d.

As shown in FIG. 9B, the first layer Z1 in contact with the outer peripheral surface of the liner 2 is formed by winding the bands 31 made of reinforced fibers by low angle helical winding such that ends of the bands 31 (31A), 31 (31B), 31 (31C) each are superposed. The first layer Z1 is formed over the entire body 2a and shoulders 2c, 2c of the liner 2. Note that, in the following description, each wound band is marked with "31A", "31B" and "31C" so as to be distinguished from one another.

As shown in FIG. 9B, in the first layer Z1, the ends of the adjacent bands 31A, 31B are superposed to form a lap portion 41. Further, the ends of the adjacent bands 31B, 31C are superposed to form a lap portion 42. Portions which are not superposed with adjacent bands 31, that is, the second tow 31b to fourth tow 31d are non-lap portions 43.

The lap portion 41 is formed by the fifth tow 31e of the band 31A being superposed with the first tow 31a of the band 31B. Though a lap length may be appropriately set, in the present embodiment, the lap length is set to be the width of one tow (one bundle). The thickness t2 of the lap portion 41 is twice the thickness t1 of the non-lap portion 43.

The lap portion 42 is formed by the fifth tow 31e of the band 31B being superposed with the first tow 31a of the band 31C. The thickness t2 of the lap portion 42 is twice the thickness t1 of the non-lap portion 43.

As shown in FIG. 9B, the second layer Z2 is formed by winding the bands around the outer peripheral surface of the first layer Z1, for example, by hoop winding. As shown in FIG. 1, the bands 32 are wound by hoop winding in a circumferential direction (Y-axis direction in a planar view) of the body 2a of the liner 2. Accordingly, the bands 32 are wound so as to cross the bands 31A, 31B, 31C. Each tow of the bands 32 is formed, as with the bands 31, to have the same width and thickness. Meanwhile, both ends of the band 32 are formed with carbon fibers of which property (for example, strength, elastic modulus) is lower than that of the other portions. Also, in the second layer Z2, as in the first layer Z1, the ends of the bands 32 are superposed by the width of one tow to form the lap portions, and the non-lap portions are formed at which adjacent bands 32 are not superposed.

Though a specific illustration is not shown, in the third layer Z3 and the following, as in the first layer Z1 and second layer Z2, the ends of the bands are superposed by the width of one tow to form the lap portions, and the non-lap portions are formed at which adjacent bands are not superposed.

A description for the reinforcing layer forming step according to the second embodiment is not described because it is substantially the same as that in the first embodiment except for the thickness and property of the ends of the bands.

According to the pressure vessel 1A of the second embodiment described above, the strength at the ends of the bands 31 constituting the lap portions 41, 42 is set to be low, to allow the reinforcing layer to have even strength. In other words, the lap portions 41 and 42 have twice the thickness of the non-lap portion 43, the lap portions 41, 42 and non-lap portion 43 have even strength per unit area, because the strength of the tows constituting the lap portions 41, 42 is reduced.

More specifically, as shown in FIG. 10A, in the second embodiment, the second tow 31b to fourth tow 31d are each assumed to have the unit strength of "1.0", and the first tow 31a and fifth tow 31e which constitute the lap portions 41, 42 are each set to have, for example, the unit strength of "0.7". Accordingly, the lap portion 41 has the actual strength of the sum of the strength of the first tow 31a and fifth tow 31e, which is approximately "1.4". This allows the lap portions 41, 42 and the non-lap portion 43 to have even strength per unit area, as compared to conventional cases.

For example, in order to have even strength, properties (e.g., tensile strength, elastic modulus) of the first tow 31a and fifth tow 31e may preferably be selected as appropriate such that, when internal pressure acts in the pressure vessel 1A, a reactive force per unit area acting on the lap portions 41, 42 is made approximately equal to that acting on the non-lap portion 43.

FIG. 10A illustrates even strength of the lap portions 41, 42 and the non-lap portion 43, but the same holds true for rigidity. That is, according to the second embodiment, the lap portions 41, 42 and the non-lap portion 43 have even rigidity per unit area.

For example, in order to have even rigidity, properties (e.g., tensile strength, elastic modulus) of the first tow 31a and fifth tow 31e may preferably be selected such that, when internal pressure acts in the pressure vessel 1A, bending stress acting on the lap portions 41, 42 is made approximately equal to bending stress acting on the non-lap portion 43.

Further, in the reinforcing layer forming step of the present embodiment, the property of the carbon fibers constituting the bundles of the first roll R1 and fifth roll R5 is only made lower than that of the second roll R2 to fourth roll R4, allowing for making the reinforcing layer 4 easily.

The second embodiment of the present invention has been described above, but can be modified as appropriate with a range not departing from the spirit of the present invention. As shown in FIGS. 9A and 9B, in the second embodiment, though the thickness of each tow constituting the bands 31, 32 is constant, the thickness of the fifth tow 31e and first tow 31a constituting the lap portions 41, 42 may be made thinner than the other bundles. This can reduce unevenness in each layer, or can eliminate unevenness. In this case, the thickness of the bundles is made thinner, which may cause the properties of the bands 31, 32 to be degraded, so that the properties of the fifth tow 31e and first tow 31a may be preferably changed to allow the lap portions 41, 42 and the non-lap portion 43 to have an even thickness and even properties.

Further, in the second embodiment, the property at both ends of the bands 31, 32 is degraded, but the property at either end may only be degraded. FIG. 10B is a conceptual diagram showing the strength of a modification of the second embodiment. As shown in FIG. 10B, for example, the first tow 31a to fourth tow 31d in the band 31 are formed to have the same strength, and the fifth tow 31e is formed to have a lower strength than the other bundles. Here, the first tow 31a to fourth tow 31d are each assumed to have the unit strength of "1.0", and the fifth tow 31e is set to have, for example, the unit strength of "0.5".

In the reinforcing portion forming step, the fifth tow 31e is superposed with the first tow 31a between the adjacent bands 31. Accordingly, the lap portions 41, 42 each have the actual strength of the sum of the strength of the first tow 31a and fifth tow 31e, which is approximately "1.5". This allows the lap portions 41, 42 and the non-lap portion 43 to have even strength per unit area as compared with conventional cases.

FIG. 10B describes the strength of the lap portion 41, 42 and the non-lap portion 43, but the same holds true for rigidity. That is, according to the modification of the second embodiment, the lap portions 41, 42 and the non-lap portion 43 can have even rigidity per unit area.

Still further, the above-described embodiments exemplify the pressure vessel in which the liner having the hollow portion is wound with the reinforced fibers, but the reinforcing layer forming step (filament winding method) according to the present invention may be applied to a case where the reinforcing layer is formed on other structures.

That is, in the filament winding method for winding the bands formed with the reinforced fibers around the structure to form the reinforcing layer in which the bands are layered, the method may include a step in which the bands are wound around the structure while the ends of the adjacent bands are superposed to form the lap portions, and at least one end of the adjacent bands in the lap portion may be formed thinner than the other portion of the band.

The filament winding method like this can obtain substantially the same effects as the first embodiment. The structure to be formed with the reinforcing layer is not particularly limited.

Yet further, in the filament winding method for winding the bands formed with the reinforced fibers around the structure to form the reinforcing layer in which the bands are layered, the method may include a step in which the bands are wound around the structure while the ends of the adjacent bands are superposed to form the lap portions, and a property (for example, tensile strength, elastic modulus) per unit area of at least one end of the adjacent bands in the lap portion may be lower than that of the other portions of the band.

The filament winding method like this can obtain substantially the same effect as the second embodiment. The structure to be formed with the reinforcing layer is not particularly limited.

EXPLANATION OF REFERENCES 1 pressure vessel
2 liner
2a body 2b neck
2c shoulder
3 metal mouth member
4 reinforcing layer
21 lap portion
22 lap portion
23 non-lap portion

The invention claimed is:

1. A pressure vessel comprising:
a liner having a hollow portion; and
a reinforcing layer that covers a circumference of the liner,
wherein:
the reinforcing layer includes layers of bands wound around the liner,
each of the bands includes a plurality of tows collected together and resin which impregnates the tows,
the plurality of tows of each band are aligned in a lateral direction of the band, each of the tows includes a bundle of reinforced fibers and at least one tow at an end in a width direction of each band has a smaller number of the reinforced fibers than other tows of the band,
a lap portion is defined in each layer of the reinforcing layer where the ends in the width direction of adjacent windings of the bands are superposed on each other such that each lap portion includes at least one of the tows of each of the superposed adjacent windings of the bands disposed to overlap with each other; and
at least one of the ends of the adjacent windings of the bands in each of the lap portions is thinner than other portions of the bands.

2. The pressure vessel according to claim 1, wherein strength per unit area of at least one of the ends of the adjacent windings of the bands in each of the lap portions is higher than that of other portions of the bands.

3. The pressure vessel according to claim 1, the bands of the reinforcing layer are wound around the liner under tension and the reinforcing layer entirely covers a body and shoulders of the liner.

4. The pressure vessel according to claim 1, wherein each of the bands has a uniform lateral width along a longitudinal length of the band.

5. A pressure vessel comprising:
a liner having a hollow portion; and
a reinforcing layer that covers a circumference of the liner,
wherein:
the reinforcing layer includes layers of bands wound around the liner, each of bands includes a plurality of tows collected together and resin which impregnates the tows,
the plurality of tows of each band are aligned in a lateral direction of the band, each of the tows includes a bundle of reinforced fibers and at least one tow at an end in a width direction of each band has a smaller number of the reinforced fibers than other tows of the band,
a lap portion is defined in each layer of the reinforcing layer where the ends in the width direction of adjacent windings of the bands are superposed on each other such that each lap portion includes at least one of the tows of each of the superposed adjacent windings of the bands disposed to overlap with each other; and
strength per unit area of at least one of the ends of the adjacent windings of the bands in each of the lap portions is lower than that of other portions of the bands.

6. The pressure vessel according to claim 5, wherein at least one of the ends of the adjacent windings of the bands in each of the lap portions has a smaller number of the reinforced fibers and is thinner than other portions of the bands in the corresponding lap portion.

7. A pressure vessel comprising:
a liner having a hollow portion; and
a reinforcing layer that covers a circumference of the liner,
wherein:
the reinforcing layer includes layers of bands wound around the liner,
each of the bands includes a plurality of tows collected together and resin which impregnates the tows,
the plurality of tows of each band are aligned in a lateral direction of the band, each of the tows includes a bundle of reinforced fibers and at least one of the tows at an end in a width direction of each band has a number of the reinforced fibers which is half of a number of the reinforced fibers in other said tows of the band,
a lap portion is defined in each layer of the reinforcing layer where the ends in a width direction of adjacent windings of the bands are superposed on each other such that each lap portion includes at least one of the tows of each of the superposed adjacent windings of the bands disposed to overlap with each other; and
at least one of the ends of the adjacent windings of the bands in each of the lap portions is thinner than other portions of the bands and has the at least one tow having half the number of the reinforced fibers.

8. The pressure vessel according to claim 7, wherein the bands of the reinforcing layer are wound around the liner under tension and the reinforcing layer entirely covers a body and shoulders of the liner.

9. The pressure vessel according to claim 7, wherein each of the bands has a uniform lateral width along a longitudinal length of the band.

* * * * *